(12) United States Patent
Maeda (10) Patent No.: US 7,486,690 B2
(45) Date of Patent: *Feb. 3, 2009

(54) DATA TRANSFER SYSTEM AND METHOD OF TRANSFERRING DATA PACKETS USING AGGREGATION/DISAGGREGATION

(75) Inventor: Keiji Maeda, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 652 days.

This patent is subject to a terminal disclaimer.

(21) Appl. No.: 11/114,229

(22) Filed: Apr. 26, 2005

(65) Prior Publication Data

US 2005/0249217 A1  Nov. 10, 2005

Related U.S. Application Data

(63) Continuation of application No. 09/558,598, filed on Apr. 26, 2000, now Pat. No. 6,904,049.

(30) Foreign Application Priority Data

Apr. 28, 1999 (JP) .............................. 1999-120986

(51) Int. Cl.
*H04L 12/56* (2006.01)
*H04L 12/28* (2006.01)

(52) U.S. Cl. ..................... 370/419; 370/395.1; 370/466
(58) Field of Classification Search .............. 370/395.1, 370/466, 467, 401, 419
See application file for complete search history.

(56) References Cited

U.S. PATENT DOCUMENTS

| 5,799,017 | A | 8/1998 | Gupta et al. ................. 370/419 |
| 5,822,321 | A | 10/1998 | Petersen et al. ............. 370/474 |
| 5,978,375 | A | 11/1999 | Petersen et al. .......... 370/395.6 |
| 6,041,054 | A | 3/2000 | Westberg ..................... 370/389 |
| 6,081,533 | A | 6/2000 | Laubach et al. ............. 370/421 |
| 6,084,889 | A | 7/2000 | Murakami ................... 370/474 |
| 6,115,392 | A * | 9/2000 | Nomura ...................... 370/466 |
| 6,456,631 | B1 * | 9/2002 | Nomura ...................... 370/466 |
| 6,754,210 | B1 | 6/2004 | Ofek .......................... 370/389 |
| 6,904,049 | B1 | 6/2005 | Maeda ........................ 370/421 |
| 7,197,044 | B1 * | 3/2007 | Kadambi et al. ............ 370/418 |

FOREIGN PATENT DOCUMENTS

| JP | 6-46080 | 2/1994 |
| JP | 6-232911 | 8/1994 |
| JP | 9-275402 | 10/1997 |
| JP | 10-126423 | 5/1998 |
| JP | 10-190742 | 7/1998 |
| JP | 10-200583 | 7/1998 |
| JP | 2000-165454 | 6/2000 |

* cited by examiner

*Primary Examiner*—John Pezzlo
(74) *Attorney, Agent, or Firm*—Harrity & Harrity, LLP (57) ABSTRACT

A transmission source bridge collects packets sent from nodes connected to a serial bus in accordance the IEEE1394 Standards, into one packet in an order they are to be transmitted and then sends them onto an ATM network, so that a transmission destination bridge receives this packet and divides it into a plurality of smaller packets and transfers them, in the order they were sent, to nodes connected to the serial bus in accordance with the IEEE1394 Standards.

21 Claims, 11 Drawing Sheets

FIG.9 transmission table 130

| channel No. | VC connected to transmission destination bridge | |
|---|---|---|
| | VH | VCI |
| 1 | 0 | 32 |
| 2 | 0 | 33 |
| 3 | 0 | 32 |
| 4 | 0 | 33 |

FIG.10 reception table 140

| VC connected to transmission source bridge | | offset transmission cycle | |
|---|---|---|---|
| VH | VCI | second count | cycle count |
| 0 | 32 | +20 | +500 |
| 0 | 33 | +10 | -200 |

DATA TRANSFER SYSTEM AND METHOD OF TRANSFERRING DATA PACKETS USING AGGREGATION/DISAGGREGATION

This application is a continuation of U.S. patent application Ser. No. 09/558,598 filed Apr. 26, 2000, now U.S. Pat. No. 6,904,049, issued Jun. 7, 2005, which claims priority from Japanese Patent Application No. 11-120986, filed Apr. 28, 1999, the disclosures of which are hereby incorporated herein by reference.

BACKGROUND OF THE INVENTION

1. Field of the Invention

The present invention relates to a data transfer system and a method and, more particularly, to the data transfer system and the method whereby data sent as an isochronous packet over a high-performance serial bus (hereinafter called 1394 bus) standardized in IEEE Std 1394-1995 is transferred via an Asynchronous Transfer Mode (ATM) network to another 1394 bus.

2. Description of the Related Art

By use of isochronous transfer through a high performance serial bus standardized in IEEE Std 1394-1995, it is possible to transmit and receive real-time data such as time-varying images.

Japanese Laid-Open Patent Application No. Hei10-190742 (hereinafter referred to as Literature 1), on the other hand, discloses a data transmission method and an apparatus using the same whereby data can be transmitted using a 1394 bus with an ATM cell sent thereon. By using the data transmission method and apparatus, data can be transferred between terminals connected via an ATM network to the 1394 bus.

Also, Japanese Laid-Open Patent Application No. Hei9-275402 (hereinafter referred to as Literature 2) discloses other apparatuses and methods whereby ATM-standard data is converted into IEEE1394-standard data.

The IEEE Std 1394-1995 standards, however, have such limitations in terms of a number of terminals and a distance as a maximum number of terminals (hereinafter also referred to as nodes) that can be connected to one 1394 bus being 63, a maximum distance between mutually adjacent nodes being 4.5 meters, and a maximum bus length being 72 meters. That is, there occurs such a problem that real-time data cannot be transmitted or received by use of isochronous transfer between terminals with an IEEE1394 interface if they are in excess of the above-mentioned number limit or distance limit.

Standards of Literature 1, on the other hand, have such a problem that there are required such processing of taking out an ATM cell from an isochronous packet and processing of sending an ATM cell onto the isochronous packet, which are not required to communicate data over a 1394 bus to all terminals which each have an interface connectable to that bus. That is, Literature 1 standards suffer a problem that its invention cannot be implemented unless a conventional terminal is provided with a method and an apparatus required to execute above-mentioned two types of processing. Literature 2 refers to no means for solving the above-mentioned problems either.

SUMMARY OF THE INVENTION

In view of the above, it is an object of the present invention to provide a data transfer system and a method whereby data can be transmitted and received between terminals free of above-mentioned restrictions of IEEE1394 Standards on a number and a mutual distance of connectable terminals and, also, a relevant terminal need not be changed at all when an ATM cell is sent onto a 1394 bus.

According to a first aspect of the present invention, there is provided a data transfer system used in a system for transferring a plurality of packets in a serial manner, including:

a packet creating section for collecting the plurality of packets transferred in the serial manner to create a transfer packet;

a cell sending section for converting the transfer packets created by the packet creating section into a cell able to be sent onto a predetermined communication network and then sending the cell onto the predetermined communication network;

a packet reconfiguring section for receiving the cell from the predetermined communication network and then reconfiguring a packet having same contents as the transfer packet created by the packet creating section; and packet dividing/transferring section for dividing the transfer packet reconfigured by the packet reconfiguring section and then transferring in the serial manner.

In the foregoing, the preferable mode is one wherein the packet creating section collects the plurality of packets transferred in the serial manner every first time lapse.

Also, the preferable mode is one wherein the packet creating section includes, in the packet, information of time when the plurality of packets are sent.

Also, the preferable mode is one wherein the packet dividing/transferring section transfers the divided packet in the serial manner based on the time information.

Also, the preferable mode is one wherein the packet dividing/transferring section decides a cycle during which the divided packet is to be transmitted, based on the time information.

Also, the preferable mode is one wherein the packet transferred to the packet creating section is an isochronous packet in accordance with IEEE1394 Standards.

Also, the preferable mode is one wherein the packet transferred to the packet dividing/transferring section is the isochronous packet in accordance with IEEE1394 Standards.

Also, the preferable mode is one wherein the predetermined communication network is configured from one virtual channel.

Also, the preferable mode is one wherein each of a transmission source and a transmission destination which are connected to the predetermined communication network is a terminal connected to one serial bus.

Also, the preferable mode is one wherein the predetermined communication network is configured from a plurality of virtual channels and wherein a predetermined channel of the plurality of virtual channels is specified to each packet transferred to the packet creating section.

Also, the preferable mode is one wherein information of the predetermined channel of a virtual channel is sent to both the packet reconfiguring section and the packet dividing/transferring section.

Also, the preferable mode is one wherein the packet dividing/transferring section transfers the divided packet based on the predetermined channel information.

Furthermore, the preferable mode is one wherein the transmission source connected to the predetermined communication network is a terminal connected to one serial bus, while communication destination terminals connected to the predetermined communication network are terminals connected to mutually different serial buses.

According to a second aspect of the present invention, there is provided a data transfer system used in a system for transferring a plurality of packets in a serial manner, including:

a packet creating program for collecting the plurality of packets transferred in the serial manner to create a transfer packet;

a cell sending program for converting the transfer packets created by the packet creating program into a cell able to be sent onto a predetermined communication network and then sending the cell onto the predetermined communication network;

a packet reconfiguring program for receiving the cell from the predetermined communication network and then reconfiguring a packet having same contents as the transfer packet created by the packet creating program; and packet dividing/transferring program for dividing the transfer packet reconfigured by the packet reconfiguring program and then transferring in the serial manner.

Also, according to a third aspect of the present invention, there is provided a data transfer method employed in a system for transferring a plurality of packets in a serial manner, including the steps of:

collecting, as a first step, the plurality of packets transferred in the serial manner in an order the plurality of packets are to be transmitted, to create a transfer packet;

converting, as a second step, the transfer packet created by the first step into a cell able to be sent to a predetermined communication network and then sending the cell to the predetermined communication network;

receiving, as a third step, the cell from the predetermined communication network and reconfiguring a packet having same contents as the transfer packet created in the first step; and dividing, as a fourth step, the transfer packet reconfigured by the third step and transferring the transfer packet in the serial manner.

In the foregoing, the preferable mode is one wherein the first step collects the plurality of packets transferred in the serial manner, every first time lapse.

Also, the preferable mode is one wherein the first step includes information of time when the plurality of packets were sent, in the packet.

Also, the preferable mode is one wherein the fourth step transfers the divided packet in the serial manner based on the time information.

Also, the preferable mode is one wherein the fourth step decides a cycle during which the divided packet is to be transmitted, based on the time information.

Also, the preferable mode is one wherein the packet transferred at the first step is an isochronous packet in accordance with IEEE1394 Standards.

Also, the preferable mode is one wherein a packet transferred at the fourth step is the isochronous packet in accordance with IEEE1394 Standards.

Also, the preferable mode is one wherein the predetermined communication network is configured from one virtual channel.

Also, the preferable mode is one wherein each of a transmission source and a transmission destination which are connected to the predetermined communication network is a terminal connected to one serial bus.

Also, the preferable mode is one wherein the predetermined communication network is configured from a plurality of virtual channels and wherein a predetermined channel of the plurality of virtual channels is specified to each packet transferred in the serial manner at the first step.

Also, the preferable mode is one wherein predetermined channel information of the virtual channels is sent through the predetermined communication network at the third step and at the fourth step.

Also, the preferable mode is one wherein wherein the fourth step transfers the divided packet based on the predetermined channel information.

Also, the preferable mode is one wherein the transmission source connected to the predetermined communication network is a terminal connected to one serial bus, while transmission destination terminals connected to the predetermined communication network are terminals connected to mutually different serial buses.

With the above configurations, the plurality of packets transferred in the serial manner are collected in an order they are to be sent and then delivered onto the predetermined communication network, from which thus collected plurality of packets is subsequently received and divided and then transferred in the serial manner, so that it is possible to transmit and receive data among terminals free of the restrictions of the IEEE1394 Standards on the number and the mutual distance of the connectable terminals and also that the terminal need not be changed at all when the ATM cell is sent onto the 1394 bus.

DESCRIPTION OF THE PREFERRED EMBODIMENTS

Best modes of carrying out the present invention will be described in further detail using various embodiments with reference to the accompanying drawings.

First Embodiment

Figure 1:
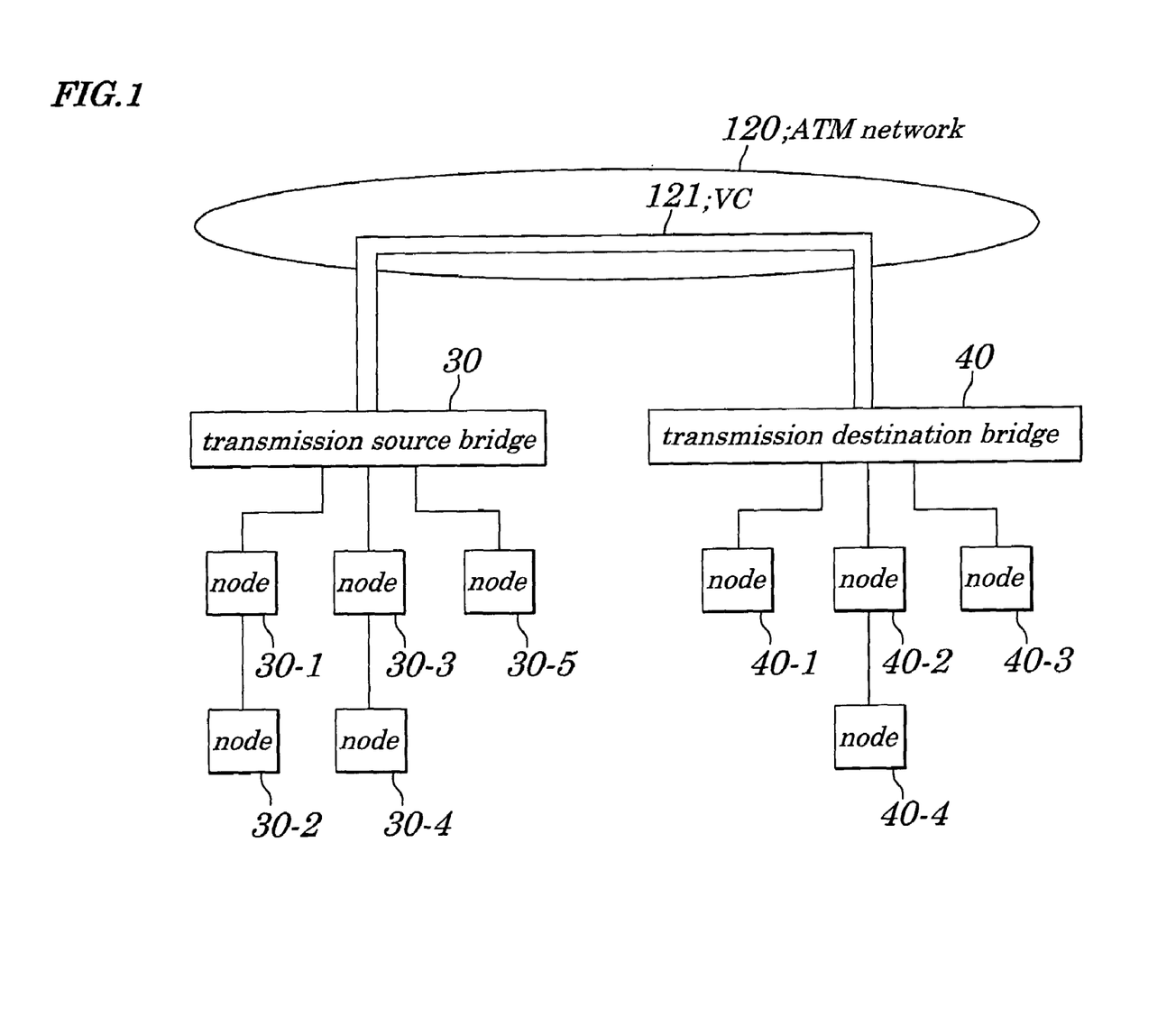
FIG. 1 is an overall configuration diagram of a data transfer system related to the present invention.

As shown in FIG. 1, a data transfer system according to the first embodiment of the present invention includes, for example, five nodes 30-1, 30-2, 30-3, 30-4 and 30-5 connected to one 1394 bus, four nodes 40-1, 40-2, 40-3 and 40-4 connected to another 1394 bus, an ATM network 120, a transmission source bridge 30 connecting nodes 30-1, 30-2, 30-3, 30-4 and 30-5 to a virtual channel (hereinafter called VC 121) in the ATM network 120, and a transmission destination bridge 40 connecting the nodes 40-1, 40-2, 40-3 and 40-4 to the VC 121.

That is, isochronous packets sent from the nodes 30-1, 30-2, 30-3, 30-4 and 30-5 are collected at the transmission source bridge 30 and then sent as one ATM cell to the VC 121 in the ATM network 120. That ATM cell is then divided into a plurality of isochronous packets at the transmission destination bridge 40, from which they are sent to each of the nodes 40-1, 40-2, 40-3 and 40-4.

A data transfer method according to the first embodiment of the present invention, on the other hand, includes a step of, during one isochronous cycle, collecting isochronous packets sent via an isochronous channel having a specific channel and then adding, as a header, time information indicating a cycle during which the isochronous packets were generated, to configure one packet. Subsequently, that packet is transferred via the ATM network 120 to the transmission destination bridge 40, where based on added cycle information the cycle is decided during which the isochronous packets included in thus transferred packets are to be transmitted via a transmission destination bus 1394 bus.

This method features that when the isochronous packets transmitted via a transmission source's 1394 bus are transferred to another 1394 bus, these isochronous packets sent during one cycle are collected into the packet in the order they were sent, so that they can be transmitted in the same order also via a transmission destination's 1394 bus. This method features also that based on information of the cycle during which the isochronous packets were generated, the cycle is decided at a transmission destination during which the isochronous packets are to be transmitted, so that a cycle-unit transmission interval employed at the transmission source can be reproduced at the transmission destination.

Figure 2:
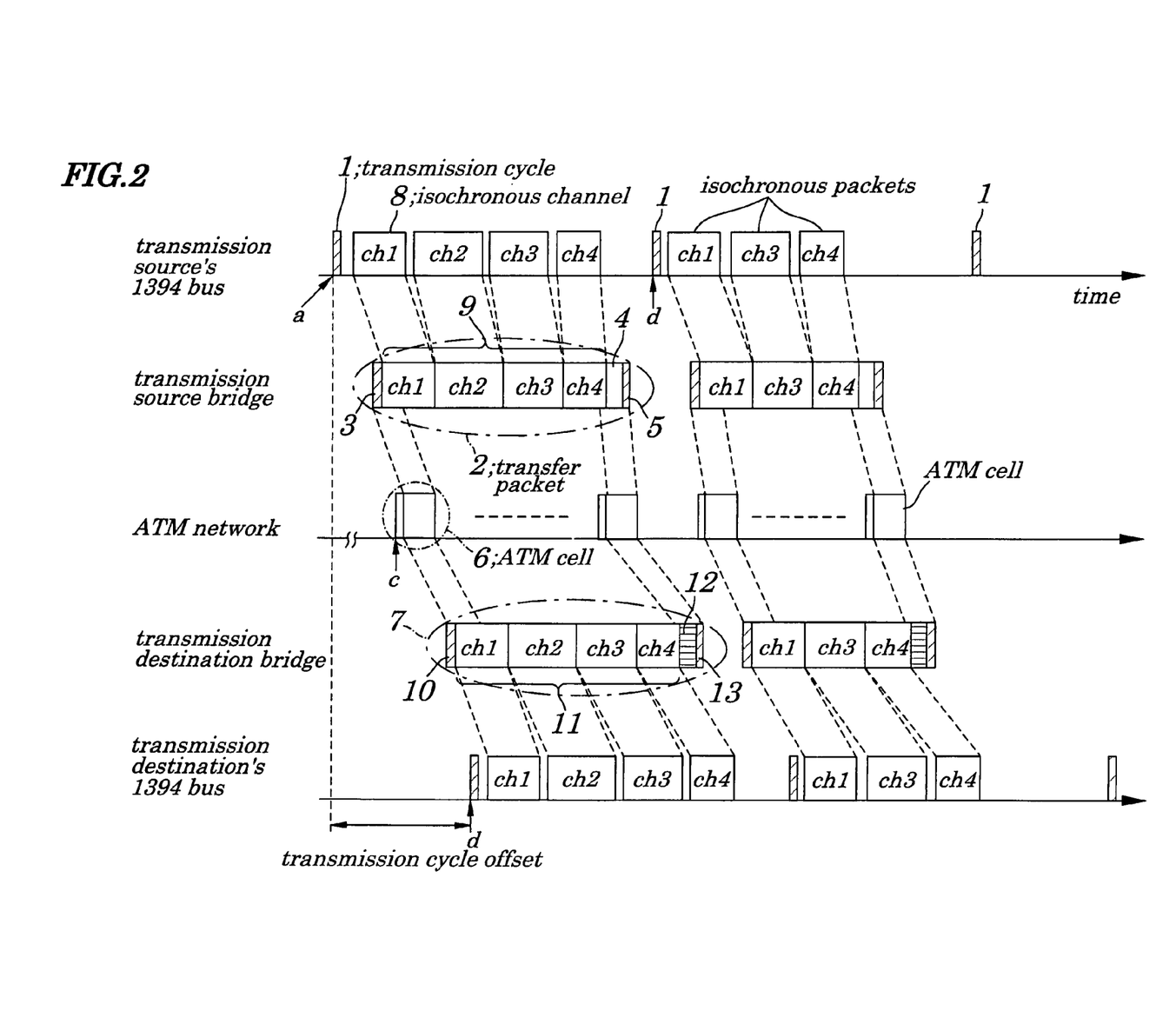
FIG. 2 is a timing chart showing a data transfer method related to the present invention.

A "transmission source's 1394 bus", shown at the top stage in FIG. 2, indicates that at the transmission source's 1394 bus, channels 1-4 of isochronous packets are transmitted in time series for each transmission cycle 1. The "transmission source's bridge" at a second stage indicates that the isochronous packets are collected into one transfer packet 2 created. The "ATM network" at the third stage indicates that the transfer packet 2 is sent as an ATM cell 6 to the ATM network. The "transmission destination bridge" at the fourth stage indicates that a transfer packet 7 is reconfigured from the ATM cell 6 at the transmission destination bridge. The "transmission destination's 1394 bus" at the fifth stage indicates that the transfer packet 7 is divided into the isochronous packets, which are then transmitted onto the transmission destination bus in time series.

As shown in FIGS. 1 and 2, at the transmission source bridge 30, isochronous packets transmitted from the nodes 30-1, 30-2, 30-3, 30-4 and 30-5 during a cycle (period from time a to time b) between time-wise adjacent cycle starting packets 1 which occur at an equal interval on the 1394 bus are collected into one packet, to which is then added a header 3 which indicates a data occurrence cycle. Then, a padding 4 and a trailer 5 for transmission to the ATM network 120 are added to create the transfer packet 2 (hereinafter may also be referred to as the transfer packet), which is then transmitted to the transmission destination bridge 40 (at time c).

At the transmission bridge destination 40, from the ATM cell 6 received from the ATM network 120, a transfer packet 7 having the same contents as the transfer packet 2 is reconfigured, so that based on both a header 10 indicating an occurrence cycle of the isochronous packets and a cycle of the transmission destination's 1394 bus, the cycle (cycle which starts from time d) is decided, during which the isochronous packets included in a data portion of the transfer packet 7 are transmitted.

During that cycle, it is possible to transmit the isochronous packets onto the transmission destination's 1394 bus, thereby transferring them while holding both an intra-cycle transmission order and the cycle-unit transmission interval on the transmission source's 1394 bus.

Second Embodiment

Next, the second embodiment of the present invention is described. As shown in FIG. 2, a transfer packet 2 generated at a transmission source bridge 30 is a Common Part Convergence Sublayer—Protocol Data Unit (CPCS-PDU) of a Type 5 ATM Adaptation Layer (hereinafter called AAL5 packet), including a header 3 indicating one certain cycle, a data portion 9 in which isochronous packets transmitted using an isochronous channel 8 having a channel number registered in that cycle beforehand are permuted in an order they were thus transmitted, and a padding 4 and a trailer 5 for configuring the AAL5 packet.

At the transmission source bridge 30, the transfer packet 2 is converted into an ATM cell 6 according to a protocol of an ATM network 120, which is a through network, and then transferred via a VC 121 to a transmission destination bridge 40. At the transmission destination bridge 40, from the ATM cell 6 received, a transfer packet 7 having a same contents as the transfer packet 2 is reconfigured. A data portion 11 of the transfer packet 7 is divided again into isochronous packets, which are then transmitted to a transmission destination's 1394 bus during a cycle decided on a basis of a cycle at a transmission source indicated in a header 10 and a current cycle at a transmission destination.

Figure 3:
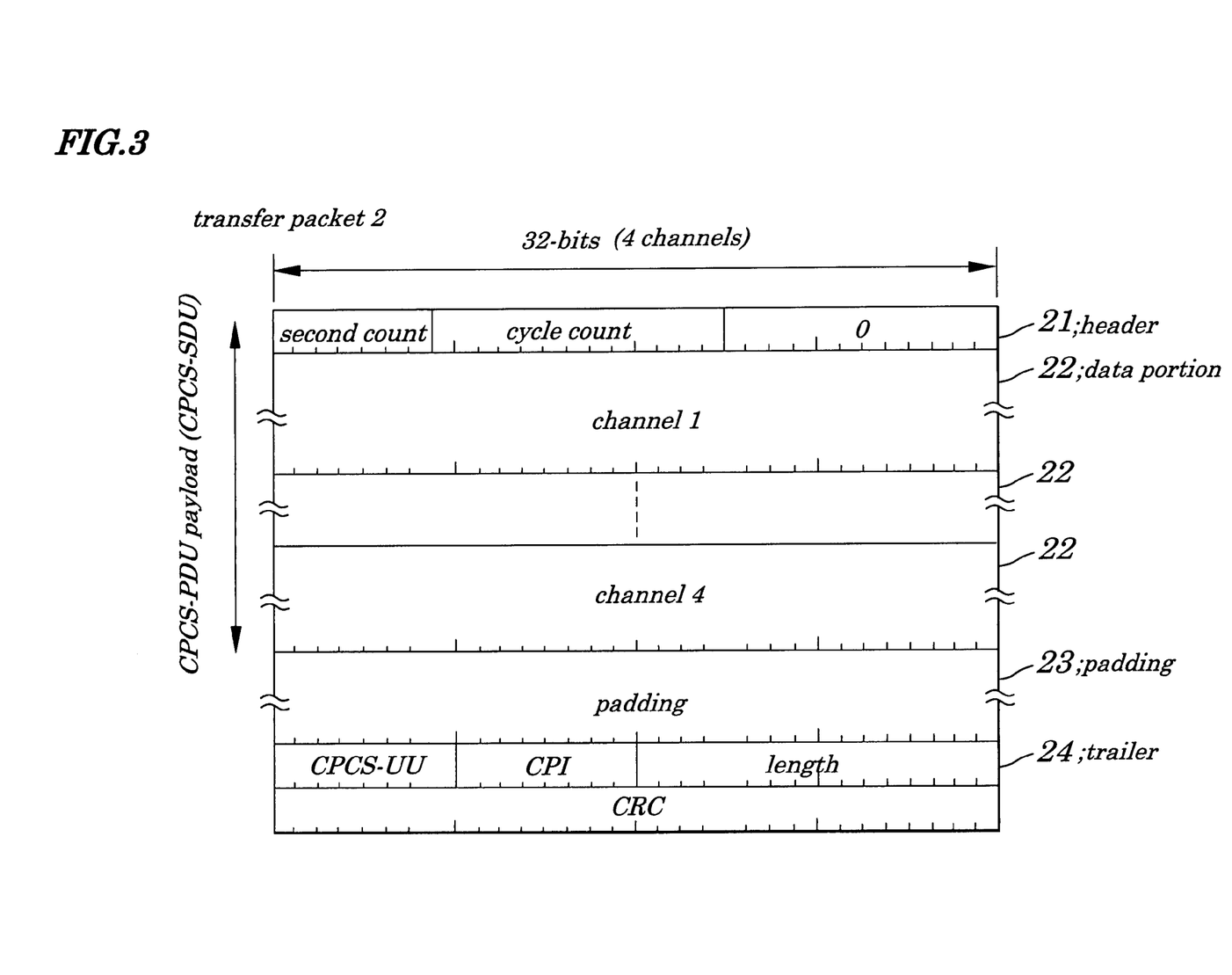
FIG. 3 is a configuration diagram showing a transfer packet 2 configured at a transmission source bridge.

As shown in FIG. 3, the transfer packet 2 comprises a header 21 indicating a cycle during which the isochronous packets included in the transfer packet 2 were transmitted, a data portion 22 into which are collected the isochronous packets transmitted during one cycle, and a padding 23 and a trailer 24 of the AAL5 packet.

The header 21 accompanies the isochronous packets, to indicate a cycle during which isochronous packets included in the data portion 22 were transmitted, specifying that cycle by using a notational system for values of a cycle time register (32-bit register) managing time provided for in IEEE Std 1394-1995. This header 21 uses its high-order 20 bits, i.e. a second count field and the cycle count field (which account for seven bits and 13 bits respectively), to specify a cycle and also uses its low-order 12 bits of a cycle-offset field indicating a time point in the cycle, which is set to 0 because it is not used when the cycle is specified.

The data portion 22 includes isochronous packets permuted in an order they were transmitted during one cycle using an isochronous channel having a channel number registered beforehand. The padding 23 and the trailer 24 each have a configuration provided for in the ITU-T Recommendation I.363.5.

As shown in FIG. 1, the transmission source bridge 30 and the transmission destination bridge 40 are interconnected via one VC 121, over which transfer packets are transferred. To the 1394 bus with which the transmission source bridge 30 is connected, a plurality of nodes 30-1, 30-2, 30-3, 30-4 and 30-5 are connected for transmission and reception of isochronous packets. Also, to the 1394 bus with which the transmission destination bridge 40, a plurality of nodes 40-1, 40-2, 40-3 and 40-4 are likewise connected for transmission and reception of isochronous packets. Note here that the maximum number of nodes which can be connected to the transmission source bridge 30 or the transmission destination bridge 40 is 63 including the bridge itself, depending on standards of the 1394 bus.

Figure 4:
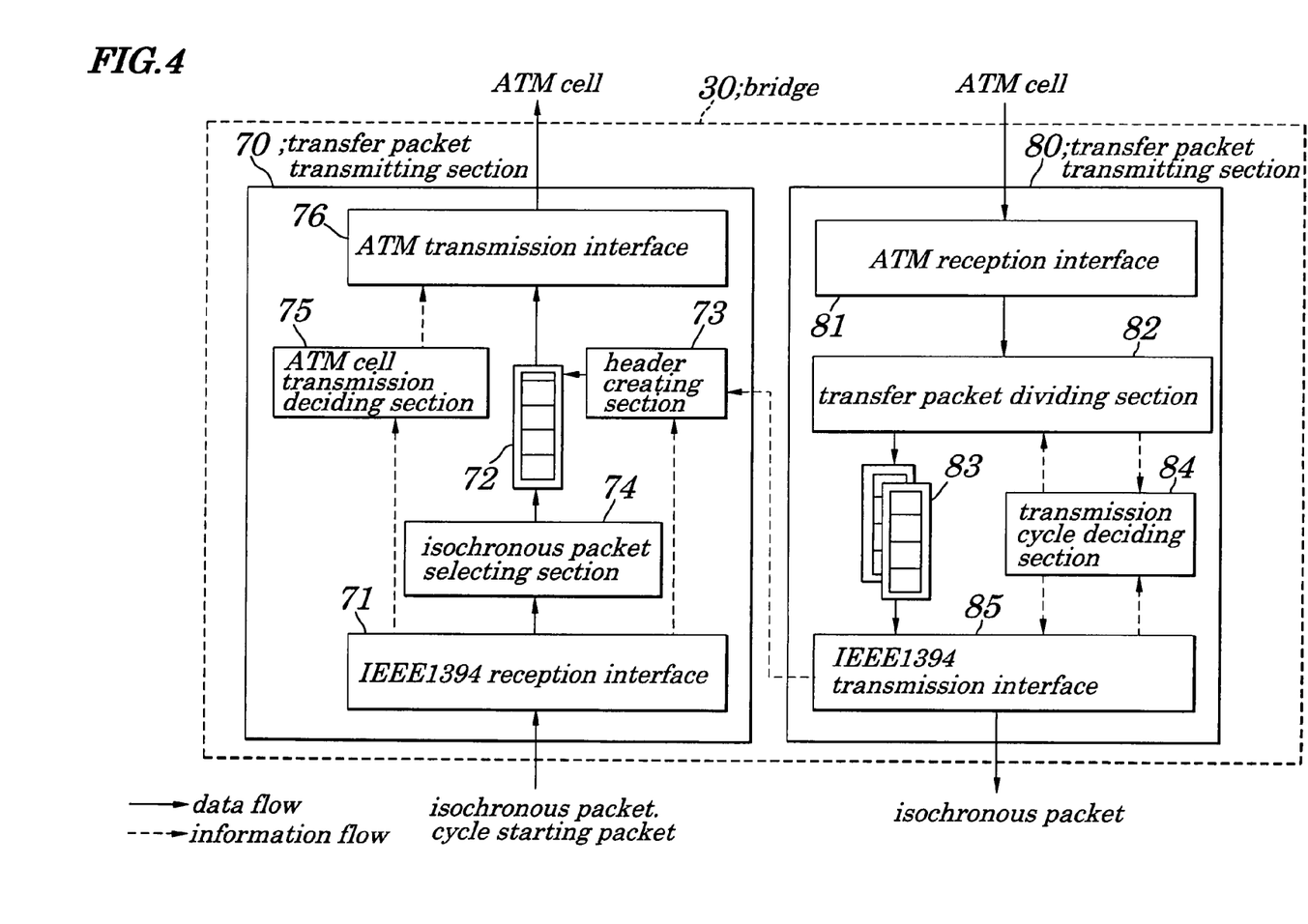
FIG. 4 is a block diagram showing a configuration example of a bridge in a first embodiment of the present invention.

As shown in FIG. 4, the bridge 30 includes a transfer packet transmitting section 70 and a transfer packet receiving section 80. Here, description of the bridge 40 is omitted, because it has almost the same configuration as the bridge 30. The transfer packet transmitting section 70 includes an IEEE1394 reception interface 71, a transfer packet transmission buffer 72, a header creating section 73, an isochronous packet selecting section 74, an ATM cell transmission deciding section 75, and an ATM transmission interface 76.

The IEEE1394 reception interface 71, when it has received a cycle starting packet 1 sent from a cycle master (not shown), posts cycle start to both the header creating section 73 and the ATM cell transmission deciding section 75. Also, the IEEE1394 reception interface 71 supplies isochronous packets received to the isochronous packet selecting section 74.

The transfer packet transmission buffer 72 has a memory to store the header 3 and the data portion 9 of the transfer packet, thereby managing storage locations of the header 3 and the data portion 9 in the memory. The transfer packet transmission buffer 72 in fact stores in the memory the header 3, written in from the header creating section 73 and the isochronous packet written in from the isochronous packet selecting section 74.

The header creating section 73, when notified of cycle start from the IEEE1394 reception interface 71, reads out a value of the cycle time register included in an IEEE1394 transmission interface 85 described later and, based on that value, creates the header 3 and then writes it into the transfer packet transmission buffer 72.

The isochronous packet selecting section 74 reads out a channel number from the header of the isochronous packet supplied from the IEEE1394 reception interface 71 and, when the channel number agrees with the channel number registered beforehand, writes that isochronous packet into the transfer packet transmission buffer 72.

The ATM transmission deciding section 75 regards cycle start notification from the IEEE1394 reception interface 71 as termination notification of the previous cycle and so specifies a Virtual Path Identifier (VPI) value and a Virtual Channel Identifier (VCI) value, to request the ATM transmission interface 76 to transmit the transfer packet. The VPI and VCI values of a VC 121 used for connection with the transmission destination bridge 40 are registered beforehand in the ATM transmission deciding section 75.

The ATM transmission interface 76, when it has received a transmission request from the ATM transmission deciding section 75, reads in the contents of the header 3 and the data portion 9 stored in the transfer packet transmission buffer 72 and adds the padding 4 and the trailer 5 of the AAL5 packet to the above-mentioned contents, thus configuring the transfer packet 2.

The ATM transmission interface 76 converts that transfer packet 2 into an ATM cell 6 and transmits it to the VC 121 having the specified VPI and VCI values.

The transfer packet 80, on the other hand, includes an ATM reception interface 81, a transfer packet dividing section 82, an isochronous transmission buffer 83, a transmission cycle deciding section 84, and the IEEE1394 transmission interface 85.

The ATM reception interface 81 reconfigures the transfer packet 7 from the ATM cell 6 received and removes a padding 12 and a trailer 13 from it and then supplies the header 10 and the data portion 11 to the transfer packet dividing section 82. The transfer packet dividing section 82 then separates from each other the header 10 and the trailer 13 supplied from the ATM reception interface 81 and posts the contents of the header 10 to the transmission cycle deciding section 84. Also, the transfer packet dividing section 82 divides the data portion 11 into isochronous packets and specifies the cycle posed from the transmission cycle deciding section 84, to perform a write-in operation to the isochronous transmission buffer 83.

The isochronous transmission buffer 83 has a memory to store isochronous packets, thereby managing storage locations of these isochronous packets in the memory for each cycle. Also, the isochronous transmission buffer 83 stores in the memory isochronous packets written in from the transfer packet dividing section 82.

The transmission cycle deciding section 84 references the contents of the header 10 posted from the transfer packet dividing section 82 and a current cycle at the transmission destination read out from the cycle time register included in the IEEE1394 transmission interface 85, to calculate and record a transmission cycle offset (i.e., time-wise difference between the cycle during which the isochronous packets included in the transfer packet 7 are to be transmitted and the cycle during which these isochronous packets were transmitted at the transmission source indicated by the header 10) taking into account processing time lapse required for transmission. Also, it decides the cycle (hereinafter may also be referred to as a transmission cycle) during which the isochronous packets included in the data portion 11 based on thus recorded transmission cycle offset and posts thus decided cycle to the transfer packet dividing section 82 and the IEEE1394 transmission interface 85. The above-mentioned processing time lapse required for transmission used in calculation of the transmission cycle offset is registered beforehand in the cycle deciding section 84.

The IEEE1394 transmission interface 85 includes the cycle time register for indicating the time of the 1394 bus connected thereto, so that during the cycle posted from the transmission cycle deciding section 84, it transmits isochronous packets stored in and managed by the isochronous transmission buffer for each cycle, onto the 1394 bus.

Figure 5:
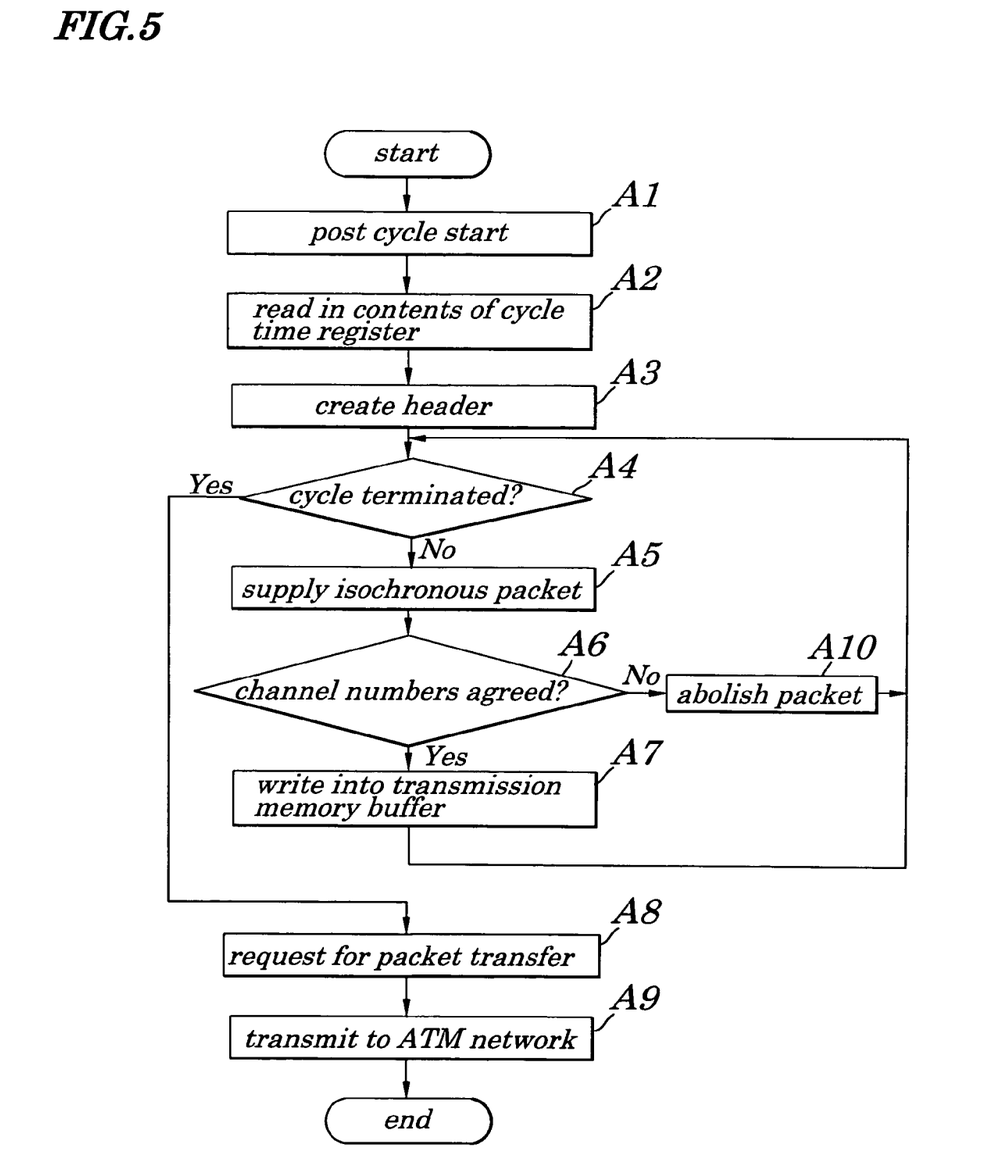
FIG. 5 is a flowchart showing operations of the first embodiment.

The following will describe in detail the operations of the second embodiment with reference to FIGS. 2, 4, 5, and 6. First, the operations, during one cycle, of the transfer packet transmitting section 70 shown in FIG. 4 are described with reference to FIGS. 2, 4, and 5. FIG. 5 shows the operations of the transfer packet transmitting section 70 when it generates one transfer packet and transmits it. Upon receiving cycle starting packet 1 sent from the cycle master resident on the transmission source's 1394 bus (time a in FIG. 2), the IEEE1394 reception interface 71 shown in FIG. 4 posts cycle start to both the header generating section 73 and the ATM cell transmission deciding section 75 (step A1 in FIG. 5). The header generating section 73, when notified of cycle start from the IEEE1394 reception interface 71, reads out the value of the cycle time register included in the IEEE1394 transmission interface 85 (step A2). The header generating section 73 regards as a header a value obtained by setting to 0 a portion, of thus read out cycle time register value, corresponding to the cycle offset field unnecessary to specify the cycle and then writes that header into the transfer packet transmission buffer 72, thus creating the header for the transfer packet (step A3).

The ATM cell transmission deciding section 75 waits for notification of the next cycle start (in other words, termination of the previous cycle) from the IEEE1394 reception interface 71, thus monitoring cycle termination (step A4). Following steps A5, A6 and A7 are repeated until that cycle is terminated, where NO is encountered at step A4.

The IEEE1394 reception interface 71 continues to supply all isochronous packets received to the isochronous packet selecting section 74 (step A5). The isochronous packet selecting section 74, when supplied with isochronous packets from the IEEE1394 reception interface 71, compares the channel number described at the header 3 of each of these isochronous packets to the channel number registered beforehand (step A6). If they agree, the isochronous packet selecting section 74 writes in the relevant packet to the transfer packet transmission buffer 72 (step A7) and, otherwise, abolishes it (step A10).

The ATM cell transmission deciding section 75, when notified of the next cycle start (in the case of YES encountered at step A4), regards it as termination of the previous cycle and so specifies VPI and VCI values registered beforehand, to request the ATM transmission interface 76 to transmit the transfer packet including the header 3 and the data portion 9 stored in the transfer packet transmission buffer 72 (step A8). The ATM transmission interface 76, when thus requested for transmission, adds the padding 4 and the trailer 5 of the AAL5 packet to the header 3 and the data portion 5 stored in the transfer packet transmission buffer 72, to configure the transfer packet 2, thus transmitting ATM cell 6 to VC 121 having these specified VPI and VCI values (step A9, i.e. time c in FIG. 2).

Figure 6:
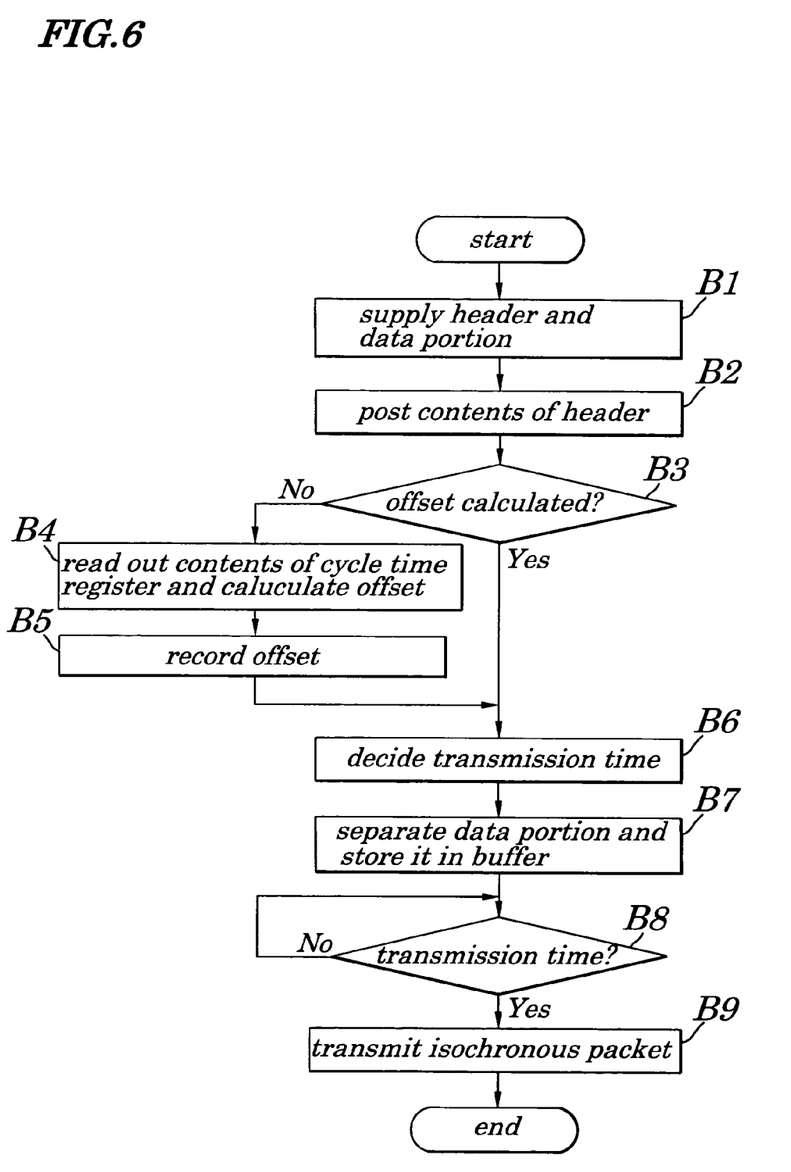
FIG. 6 is another flowchart showing the operations of the first embodiment.

The following will describe operations of the packet receiving section 80 when it has received the transfer packet, with reference to FIGS. 2, 4, and 6. FIG. 6 shows the operations of the packet receiving section 80 related to the processing of one transfer packet 2. The ATM reception interface 81 receives the ATM cell 6 from the ATM network 120 to reconfigure the transfer packet 7 and then removes the padding 12 and the trailer 13 from the AAL5 packet, to supply the header 10 and the data portion 11 to the transfer packet dividing section 82 (step B1 in FIG. 6).

The transfer packet dividing section 82, when it has received the header 10 and the data portion 11, notifies the transmission cycle deciding section 84 of the contents of the header 10 which indicate the cycle during which the isochronous packet was transmitted at the transmission source's 1394 bus (step B2). The transmission cycle deciding section 84, when notified of the header contents, decides whether a transmission cycle offset (value of a time-wise difference between a cycle at the transmission source's 1394 bus indicated by the transfer packet's header 10 and the transmission cycle) required to decide the transmission cycle for the isochronous packet is recorded in the data portion 11 of the transfer packet (step B3).

If it is recorded (in a case of YES encountered at step B3), the process proceeds to the next step B6 and, otherwise (in a case of NO encountered at step B3), the transmission cycle deciding section 84 specifies the current cycle by reading out the value of the cycle time register of the IEEE1394 transmission interface 85 to calculate the transmission cycle offset based on a transmission source cycle posted from the transfer packet dividing section 82 taking into account processing time lapse required until transmission registered beforehand (step B4). Thus calculated transmission cycle offset is recorded in the transmission cycle deciding section 84 (step B5).

Based on the transmission source cycle and the transmission cycle offset posted from the transfer packet dividing section 82, the transmission cycle deciding section 84 decides the transmission cycle (cycle starting from time d in FIG. 2) for the isochronous packet of the data portion included in the received transfer packet and then posts that transmission cycle to the transfer packet dividing section 82 and the IEEE1394 transmission interface 85 (step B6).

The transfer packet dividing section 82 divides the transfer packets 7, starting from its top, into isochronous packets in an order they were transmitted from the transmission source and then specifies the transmission cycle posted from the transmission cycle deciding section 84, to write it into the isochronous transmission buffer 83 (step B7).

The IEEE1394 transmission interface 85 suspends termination until it encounters the transmission cycle posted from the transmission cycle deciding section 84 (in a case of NO encountered at step B8). When the cycle time register value encounters the transmission cycle (in a case of YES encountered at step B8), the IEEE1394 transmission interface 85 starts staring the isochronous packets stored in the isochronous transmission buffer 83 in an order they are stored (i.e., the same order as that at the transmission source), onto the 1394 bus (step B9, i.e. time d in FIG. 2).

That is, according to the second embodiment, at the transmission source bridge 30, cycle information is added to isochronous packets transmitted during one cycle to provide one packet, which is then transferred onto the transmission source's 1394 bus, so that at the transmission destination bridge 40, that added cycle is referenced to decide the transmission cycle, thus transferring the isochronous packets while holding both the order they were transmitted onto the transmission source's 1394 bus during the transmission source cycle and the relevant cycle-unit transmission interval.

The benefit is that by using a data transfer system, an apparatus, and a method according to the present embodiment, any terminals with an IEEE1394 interface need not be altered at all to increase their number and the distance therebetween in transmission and reception of isochronous packets among themselves.

In fact, as shown in FIG. 1, data could be transmitted and received among only up to five terminals (63 at the maximum), e.g. terminals 30-1, 30-2, 30-3, 30-4 and 30-5, having conventional IEEE1394 standards. Likewise, data could be transmitted and received among only up to four (63 at the maximum) of terminals 40-1, 40-2, 40-3 and 40-4.

According to the present embodiment, however, the terminals 30-1, 30-2, 30-3, 30-4 and 30-5 are connected through the bridges 30 and 40 with the terminals 40-1, 40-2, 40-3 and 40-4 over the network 120, thus enabling data transmission and reception among nine terminals of these five terminals 30 plus these four terminals 40. Supposing the maximum number of connectable terminals is 63 for both the terminal 30 and 40, data can be transmitted and received among a total of 126 terminals. With this, the inter-terminal distance can be extended over the conventional.

Third Embodiment

Figure 7:
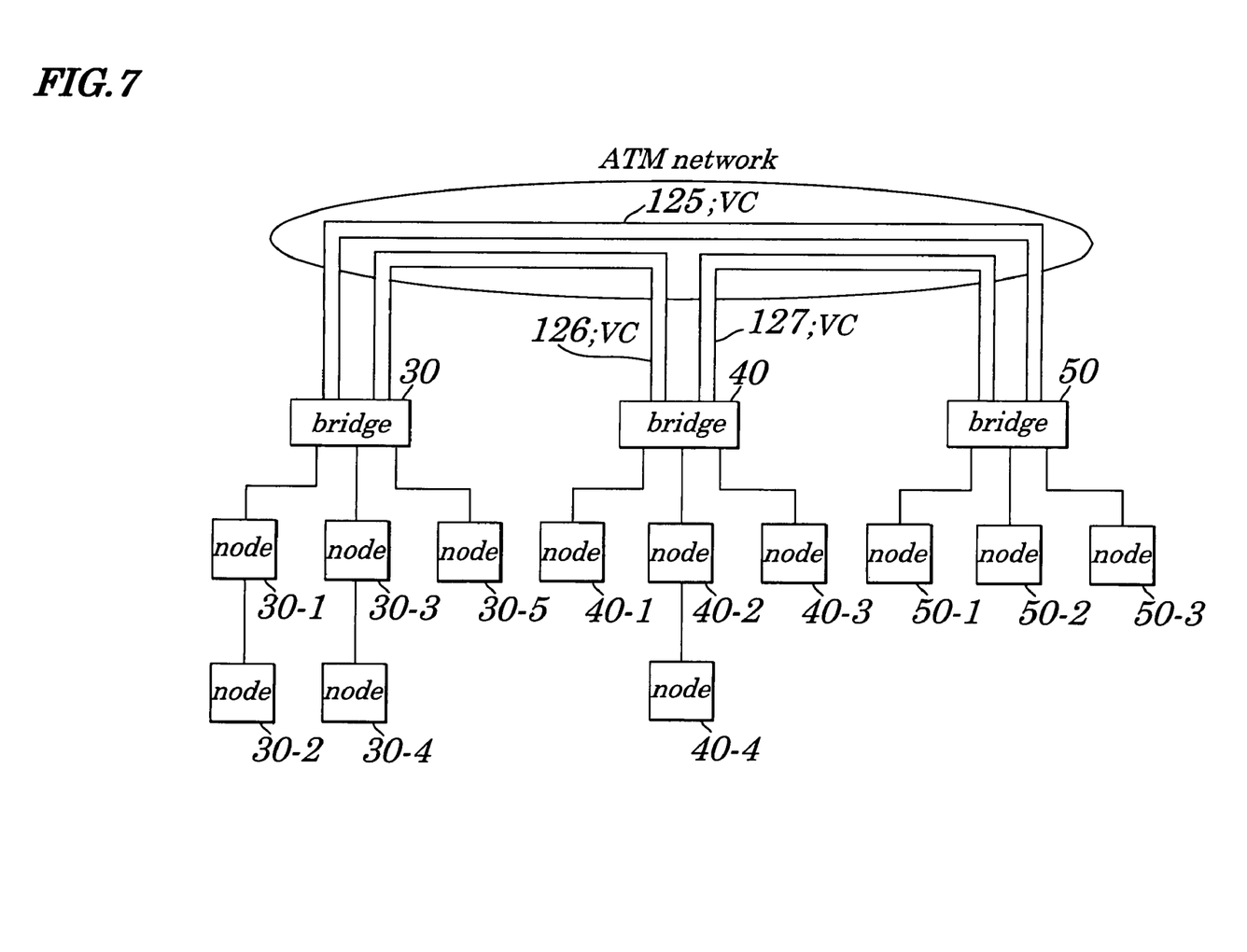
FIG. 7 is a configuration diagram of a system according to a second embodiment.

The following will describe the third embodiment of the present invention. As shown in FIG. 7, the third embodiment relates to a data transfer system, an apparatus, and a method for connecting one bridge 30 with a plurality of bridges (two bridges 40 and 50 in FIG. 7) through different VC 125, VC 126 and VC 127. The bridges 30, 40, and 50 have nodes 30-1, 30-2, 30-3, 30-4 and 30-5, 40-1, 40-2, 40-3 and 40-4, and 50-1, 50-2 and 50-3 connected thereto respectively, which are all capable of transmitting and receiving isochronous packets.

Figure 8:
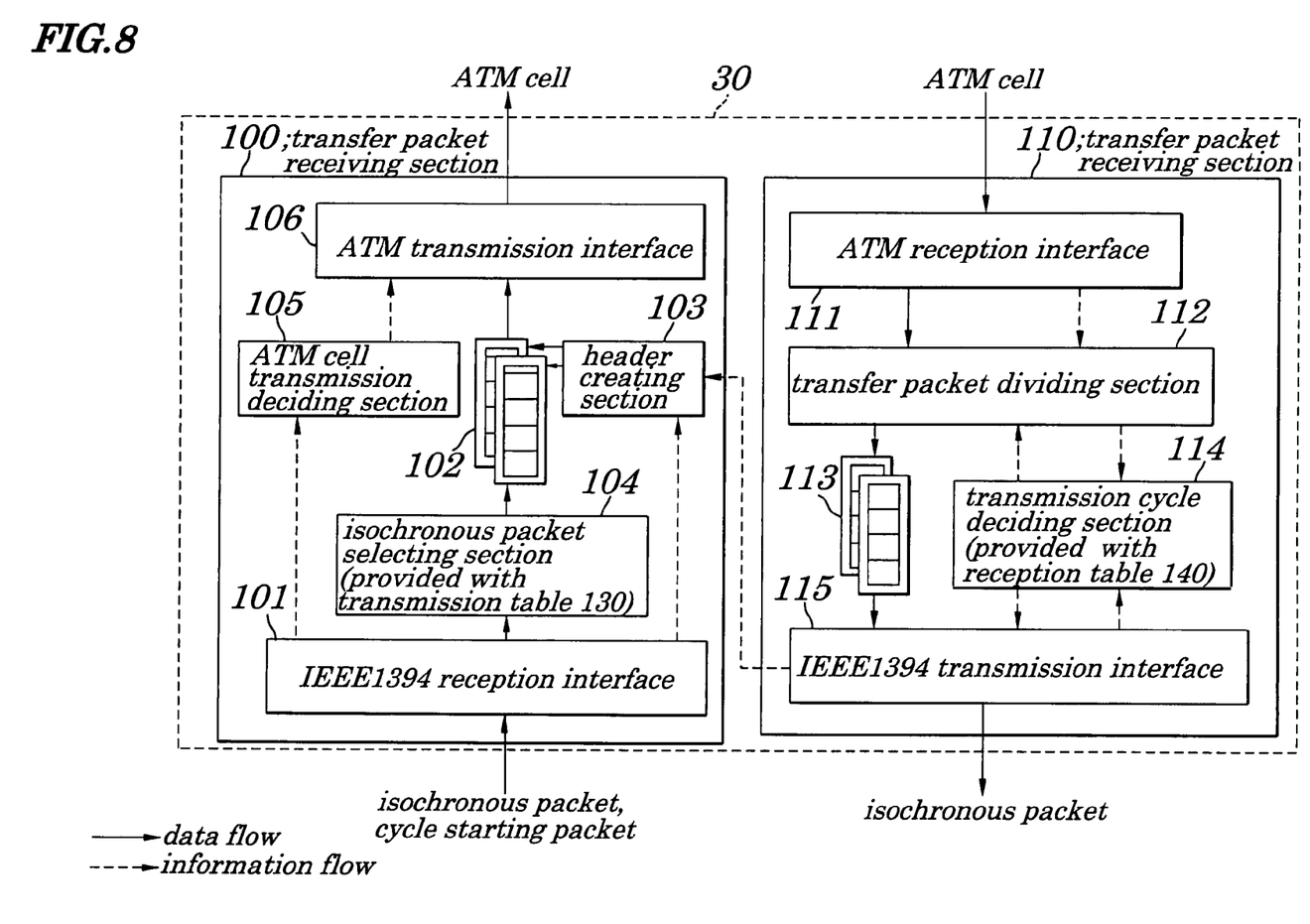
FIG. 8 is a block diagram showing a configuration example of a bridge in the second embodiment of the present invention.

As shown in FIG. 8, the bridge 30 includes a transfer packet transmitting section 100 and a transfer packet receiving section 110. The description of the bridges 40 and 50 is omitted here, because they have same configurations as the bridge 30. Functions of the transfer packet transmitting section 100 are different from those of a transfer packet transmitting section 70 of the second embodiment shown in FIG. 4 in the following respects.

A transfer packet transmission buffer 102, which has a plurality of transfer packet transmission buffers 72 for transfer packet-specific management shown in FIG. 4, discriminates VCs based on VPI and VCI values and stores a header 3 and a data portion 9 of each transfer packet in a memory. A header creating section 103, when notified of cycle start from an IEEE1394 reception interface 101, specifies VPI and VCI values of the respective VCs used for connection with a transmission destination, thus writing the same header 3 into the transfer packet transmission buffer 102. The VPI and VCI values thus used are registered beforehand in the header creating section 103.

Figure 9:
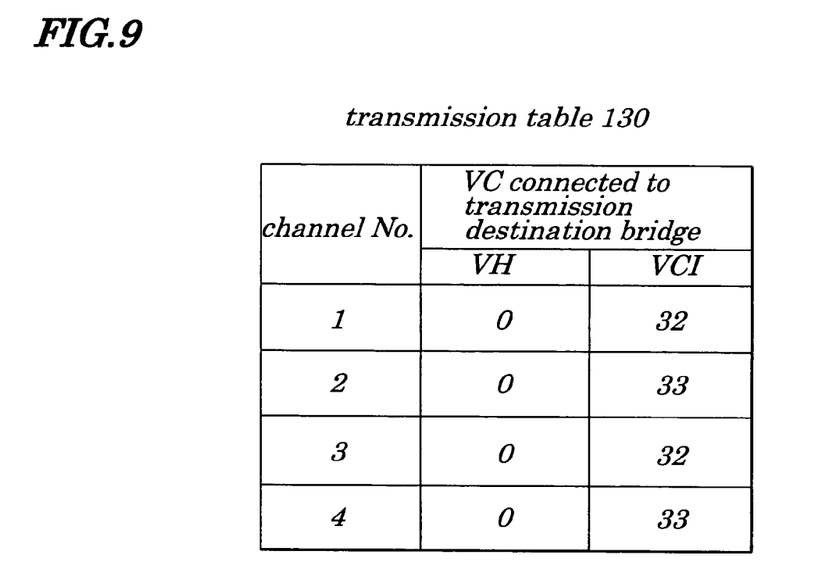
FIG. 9 is a format diagram of a transmission table.

An isochronous packet selecting section 104, which has a transmission table 130 shown in FIG. 9, retrieves an isochronous packet supplied from the IEEE1394 reception interface 101 in that transmission table 130 to specify a VC for a connection destination using as a key a channel number described in a header of that isochronous packet, thereby specifying VPI and VCI values of that VC and writing them into the transfer packet transmission buffer 102. The contents of the transmission table 130 are registered beforehand in an isochronous packet selecting section 104.

An ATM cell transmission deciding section 105 regards the next cycle start given from the IEEE1394 reception interface 101 as terminal notification of a previous cycle and then specifies VPI and VCI values of each VC for the connection destination, thus requesting an ATM transmission interface 106 to transmit a transfer packet 2. These VPI and VCI values of each VC for the connection destination are registered beforehand in the ATM cell transmission deciding section 105 as well as in the header creating section 103. The description of the functions of the IEEE1394 reception interface 101 and the ATM transmission interface 106 is omitted here, because they are the same as those of blocks 71 and 76 of the second embodiment shown in FIG. 4.

The functions of the blocks of the transfer packet receiving section 110 of the bridge 30 are different from those of transfer packet transmitting section 80 in the second embodiment shown in FIG. 4 in the following respects. An ATM reception interface 111 has, in addition to the functions of ATM reception interface 81 shown in FIG. 4, a function of specifying a VC through which a transfer packet is received and then posting VPI and VCI values of that VC to a transfer packet dividing section 112.

The transfer packet dividing section 112 has, in addition to the functions of transfer packet dividing section 82 shown in FIG. 4, a function of posting VPI and VCI values posted from the ATM reception interface 111 to a transmission cycle deciding section 114 together with the contents of a header 10 of the transfer packet 7.

Figure 10:
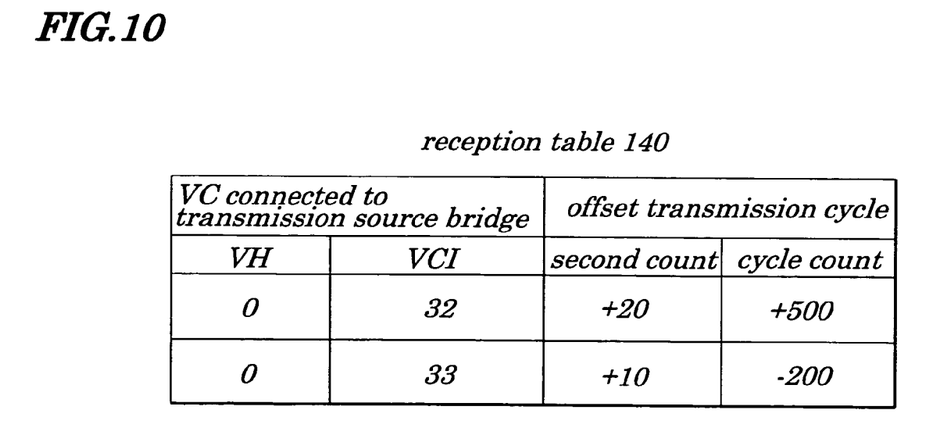
FIG. 10 is a format diagram of a reception table.

The transmission cycle deciding section 114, which has a reception table 140 shown in FIG. 10, performs a retrieval operation in that reception table 140 using as a key both VPI and VCI values posted from the transfer packet dividing section 112. If, the retrieval operation comes up with a result that no cycle offset has been recorded for the relevant VC, the same steps as those at transmission cycle deciding section 84 shown in FIG. 4 are taken to calculate a transmission cycle offset for each of the VCs having those VPI and VCI values and record them in the reception table 140. In an initial state, the reception table 140 has no transmission cycle offset registered therein and so receives an addition of a transmission cycle offset each time it is calculated when a new transfer packet is sent through each VC.

Description of functions of an isochronous transmission buffer 113 and an IEEE1394 transmission interface 115 is omitted here, because they are the same as those of the blocks 83 and 85 of the second embodiment shown in FIG. 4.

Figure 11:
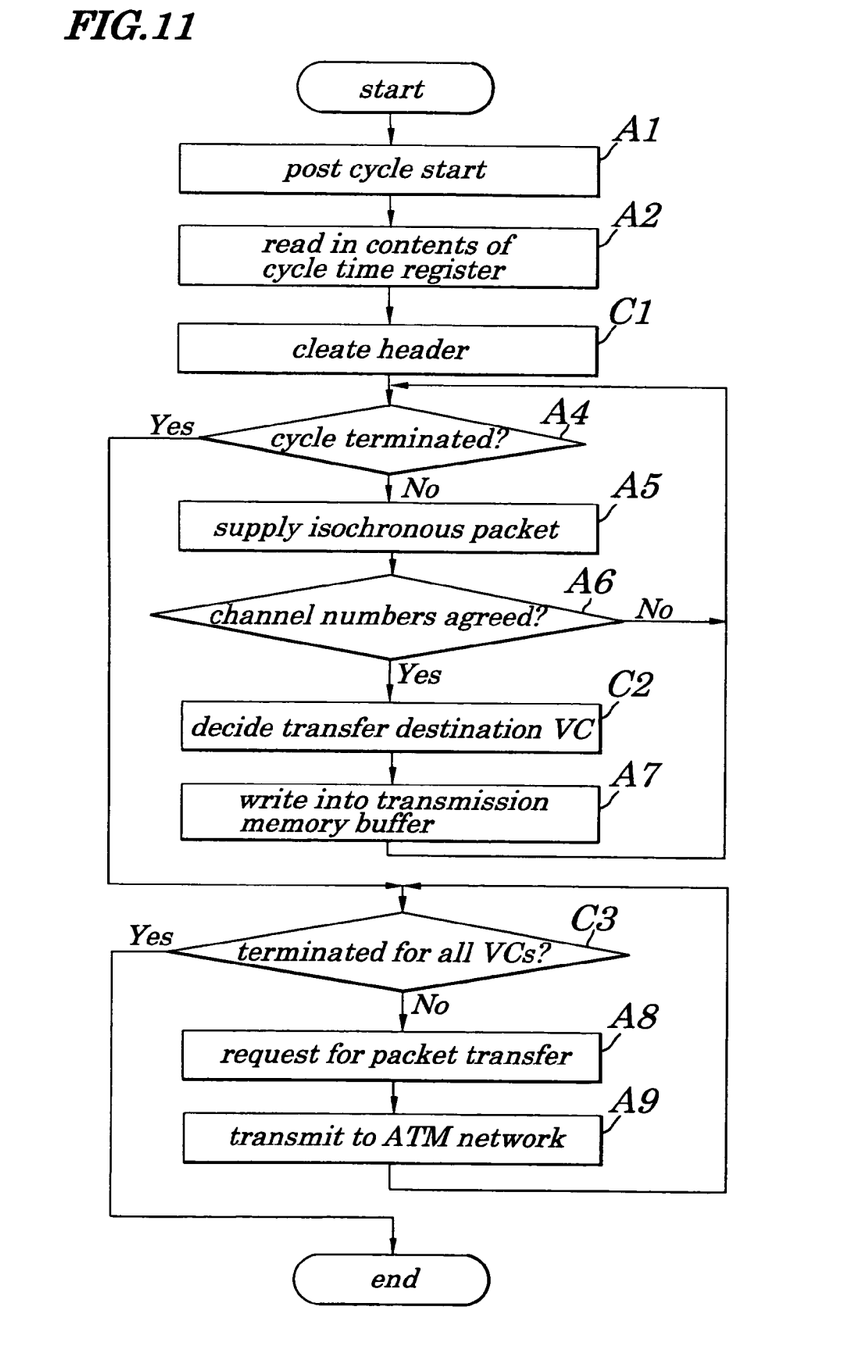
FIG. 11 is a flowchart showing operations of the second embodiment.

The following will describe in detail the third embodiment with reference to drawings. First, operations of the transfer packet transmitting section 100 are described with reference to FIGS. 4 and 8 through 12. Description of operations of the blocks indicated by steps A1, A2, and A4, A5, A6, A7, A8, A9 and A10 in FIG. 11 is omitted here, because they are the same as those of blocks of the second embodiment shown in FIG. 4.

The header creating section 103, when notified of cycle start from the IEEE1394 reception interface 101, reads in the contents of the cycle time register (steps A1 and A2 in FIG. 1) and then writes in the same header into the transfer packet transmission buffer 102 for each VC, thus creating a header 3 as many as a number of the bridges (step C1). The isochronous packet selecting section 104 performs a retrieval operation in the transmission table 130 registered beforehand which is shown in FIG. 9 using as a key a channel number of an isochronous packet supplied from the IEEE1394 reception interface 101, to decide a VC used for connection with the transfer destination bridge (step C2).

Next, the isochronous packet selecting section 104 specifies VPI and VCI values of thus decided VC, to write in the isochronous packet supplied from the IEEE1394 reception interface 101 into the transfer packet transmission buffer 102 (step A7). The ATM cell transmission deciding section 105, when notified of cycle start from the IEEE1394 reception interface 101, requests all the VCs registered beforehand to transmit a transfer packet (steps C3, A8).

The following will describe operations of the transfer packet receiving section 110 with reference to FIGS. 4, 8, 9, 10, and 12. The description of the operations at steps B1, B4, and B5, B6, B7, B8 and B9 shown in FIG. 12 of the blocks of the third embodiment shown in FIG. 8 is omitted here, because they are the same as those of the blocks of the second embodiment shown in FIG. 4.

Figure 12:
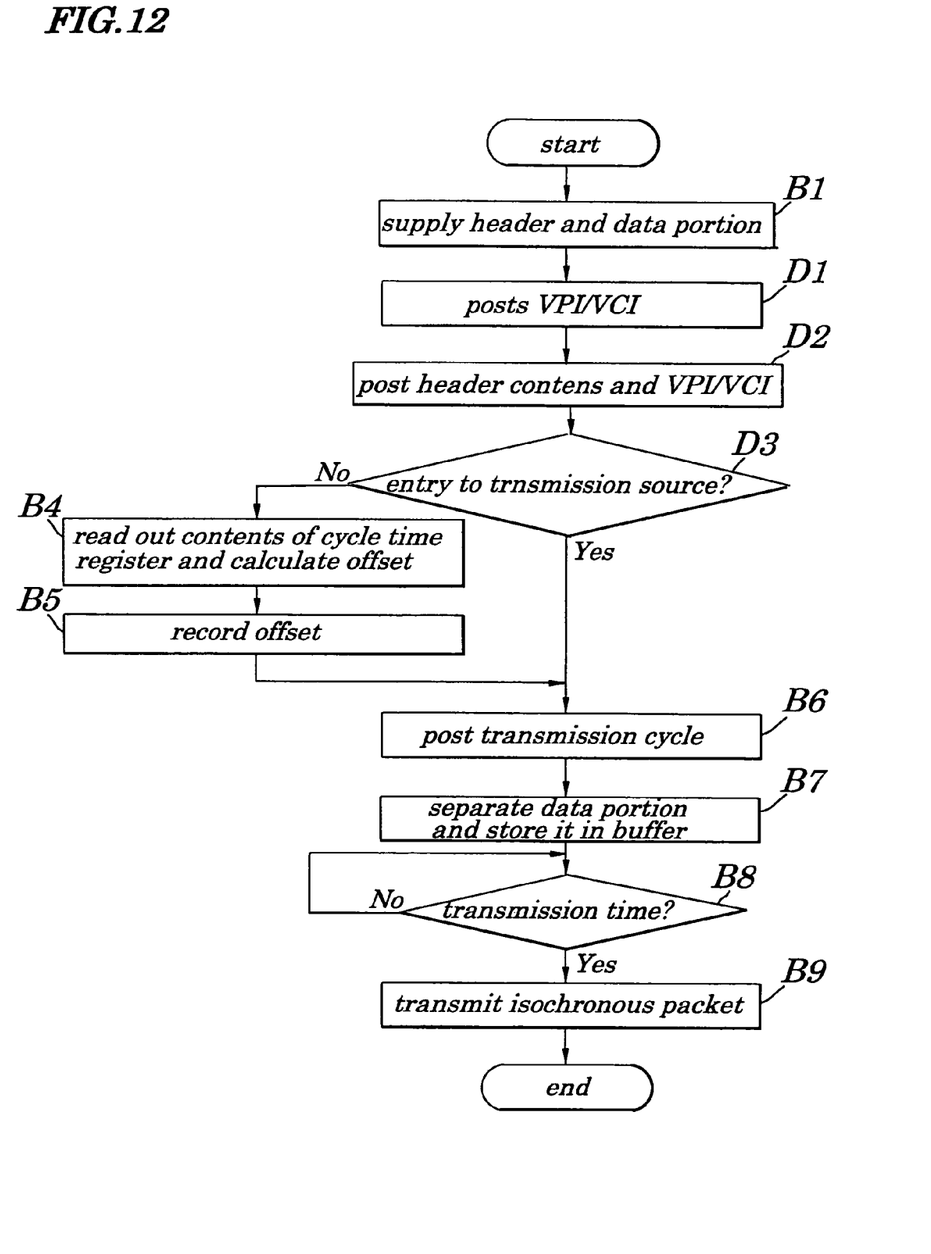
FIG. 12 is another flowchart showing the operations of the second embodiment.

The ATM reception interface 111, when it has received the transfer packet, supplies a header 10 and a data portion 11 of the transfer packet 7 to the transfer packet dividing section 112 (step B1) and also notifies it of the VPI and VCI values of the VC through which the transfer packet was received (step D1). Next, the transfer packet dividing section 112 notifies the transmission cycle deciding section 114 of thus posted VPI and VCI values as well as the contents of the header 10 of the transfer packet 7 (step D2).

The transmission cycle deciding section 114 performs a retrieval operation in the transmission table 140 using thus posted VPI and VCI values as a key, to decide whether a transmission cycle offset for that VC is recorded (step D3). If it is recorded, the process proceeds to step B6 and, otherwise (in the case of NO encountered at step D3), the transmission cycle deciding section section 114 reads in the contents of the cycle time register and then calculates a transmission cycle offset (step B4), thus creating an entry for that VC and recording it (step B5).

Hereinafter, a transmission cycle for a transfer packet sent from a VC which has its own transmission cycle offset recorded beforehand is calculated by always using this entry's transmission cycle offset and then posted to the transmission interface 115 (step B6).

The transfer packet dividing section 112 specifies a transmission cycle posted from the transmission cycle deciding section 114 and writes it into the isochronous transmission buffer 113. If any isochronous packet taken out from a transfer packet sent from another VC is already written in the isochronous transmission buffer 113, that transmission cycle is added to the last of that isochronous packet (step B7). The IEEE1394 interface 115, when it has encountered the cycle posted from the transmission cycle deciding section 114, starts transmitting the isochronous packet (steps B8, B9).

The following will specifically describe operations of transmitting the transfer packet with reference to the transmission table 130 shown in FIG. 8. As can be seen from the transmission table in FIG. 9, there are two bridges connected with VCs, which have their own VPI and VCI values of 0/32 and 0/33 respectively (in a form of VPI value/VCI value). The header creating section 103, when notified of cycle start, creates, for the transfer packet transmission buffer 102, two transfer packets for the two VCs with 0/32 and 0/33 respectively (step C1 in FIG. 11).

The isochronous packet selecting section 104 performs a retrieval operation in the transmission table and, if as a result a channel number of the isochronous packet received from the IEEE1394 reception interface is found to be 1 or 3, writes that value as a data portion of the transfer packet for the VC with 0/32 into the transfer packet transmission buffer 102. With this, the transfer packet transmission buffer 102 stores that transfer packet in a memory, managing it as discriminated from the 0/33 transfer packet. Similarly, if the channel number is 2 or 4, it writes the value as the data part of the transfer packet for the 0/33 VC into the transfer packet transmission buffer 102 (steps C2, A7).

The ATM transmission deciding section 105, when notified of cycle start, requests for transmission of the transfer packet to the 0/32 VC and the 0/33 VC in this order, thus transferring one transfer packet to each of the 0/32 and 0/33 VCs in one cycle (step C3).

The following will describe operations of receiving the transfer packet. In an initial state, the reception table has no entry therein. The transmission cycle deciding section 114 performs a retrieval operation in the reception table using as a key both VPI and VCI values posed from the transfer packet dividing section 112. When, for example, the transfer packet is received from the 0/32 VC for the first time and its header contents are such that second count=10, and cycle count=300 and the contents of the cycle time register read out are such that second count=30 and cycle count=600 and also a number of cycles registered beforehand required for transmission initiation is 200 (cycles), the transmission cycle offset values are such that second count=30−10=+20 and cycle count=600−300+200=+500.

These values are additionally recorded in the reception table 140, so that each time a transfer packet is received from the 0/32 VC, a transmission cycle offset value is added to the header contents, thus deciding the transmission cycle. One example of it is indicated by a second count and a cycle count of the 0/33 VC shown in FIG. 10.

In the third embodiment, a transmission side bridge distributes connection destination bridges using a channel number to create the transfer packet for each VC in one cycle, while a reception side records a transmission cycle offset, thus enabling transferring an isochronous packet to the plurality of bridges.

Thus, a data packet transfer system according to the present invention used for transferring packets in a serial manner includes a packet creating section for creating the transfer packet by collecting a plurality of packets transferred in the serial manner in an order they are to be transmitted, a cell sending section for converting the above-mentioned transfer packet created by the packet creating section into such a cell as to be sent to a predetermined communication network and then sending that cell onto that communication network, a packet reconfiguring section for receiving the above-mentioned cell via that above-mentioned communication network and then reconfiguring the above-mentioned transfer packet created by the above-mentioned packet creating section into a packet having the same contents as the above-mentioned transfer packet, and a packet dividing/transferring section for dividing the above-mentioned transfer packet reconfigured by the above-mentioned packet reconfiguring section into smaller packets and then transferring them in the serial manner, so that it is possible to transmit and receive data among terminals free from any restrictions by the IEEE1394 Standards on the number and the mutual distance of the terminals and also that the terminal need not be changed at all when an ATM cell is sent on a 1394 bus.

Also, a method according to the present invention used in a system for transferring packets in a serial manner includes a first step of collecting a plurality of packets transferred in the serial manner in an order they are to be transmitted to create a transfer packet, a second step of converting the above-mentioned transfer packet created by the first step into such a cell as to be sent to a predetermined communication network and then sending it to that communication network, a third step of receiving the above-mentioned cell from the above-mentioned communication network and then reconfiguring a packet having the same contents as the above-mentioned transfer packet created by the above-mentioned packet creating section, and a fourth step of dividing the above-mentioned transfer packet reconfigured by the third step into smaller packets transferring them in an serial manner, so that it is possible to transmit and receive data among terminals free of the restrictions by the IEEE1394 Standards on the number and the mutual distance of the terminals and also that the terminal need not be changed at all when an ATM cell is sent on the 1394 bus.

It is apparent that the present invention is not limited to the above embodiments but may be changed and modified without departing from the scope and spirit of the invention. For example, in the data packet transfer system of the above embodiments, all or part of the components may be composed of hardware or a like, or software or a like.

Finally, the present application claims the priority of Japanese Patent Application No. Hei11-120986 on Apr. 28, 1999, which is herein incorporated by reference.

What is claimed is:

1. A data transfer system comprising:
    an aggregation unit to receive select packets and aggregate the received select packets into source transfer packets, wherein each of the source transfer packets has an associated transmission source cycle;
    a header unit configured to create, for each of the source transfer packets, a header that indicates the associated transmission source cycle;
    a conversion unit to convert the source transfer packets to cells for transfer via a communication network;
    a reconfiguration unit to receive the transferred cells and reconfigure the received cells into destination transfer packets corresponding to the source transfer packets; and
    a disaggregation unit to disaggregate the destination transfer packets into individual packets corresponding to the received select packets, and transmit the individual packets.

2. The data transfer system of claim 1, wherein two or more of the source transfer packets are of varying lengths.

3. The data transfer system of claim 1, wherein the received select packets have associated channels that correspond with one or more of a predetermined set of channels.

4. The data transfer system of claim 1, further comprising:
a selection unit to:
   receive source packets via a source serial bus;
   select the select packets from the received source packets; and
   transfer the select packets to the aggregation unit.

5. The data transfer system of claim 4, wherein the selection unit is configured to select the select packets based on the header created for each of the source transfer packets.

6. A data transfer system comprising:
   an aggregation unit to receive select packets and aggregate the received select packets into source transfer packets, wherein each of the source transfer packets has an associated transmission source cycle;
   a conversion unit to convert the source transfer packets to cells for transfer via a communication network;
   a reconfiguration unit to receive the cells and reconfigure the received cells into destination transfer packets corresponding to the source transfer packets; and
   a disaggregation unit to disaggregate the destination transfer packets into individual packets corresponding to the received select packets, and transmit the individual packets, wherein the disaggregation unit is configured to serially transmit the individual packets to a destination serial bus during a transmission destination cycle based on the associated transmission source cycle and a cycle of the destination serial bus.

7. The data transfer system of claim 6, wherein two or more of the source transfer packets are of varying lengths.

8. The data transfer system of claim 6, wherein the received select packets have associated channels that correspond with one or more of a predetermined set of channels.

9. The data transfer system of claim 6, further comprising:
a selection unit to:
   receive source packets via a source serial bus;
   select the select packets from the received source packets; and
   transfer the select packets to the aggregation unit.

10. The data transfer system of claim 9, wherein the selection unit is configured to select the select packets based on a header created for each of the source transfer packets.

11. A data transfer system comprising:
   an aggregation unit to receive select packets and aggregate the received select packets into source transfer packets, wherein each of the source transfer packets has an associated cycle-unit transmission interval;
   a conversion unit to convert the source transfer packets to cells for transfer via a communication network;
   a reconfiguration unit to receive the cells and reconfigure the received cells into destination transfer packets corresponding to the source transfer packets; and
   a disaggregation unit to disaggregate the destination transfer packets into individual packets corresponding to the received select packets, and transmit the individual packets, wherein the individual packets are serially transmitted according to the associated cycle-unit transmission interval.

12. The data transfer system of claim 11, wherein two or more of the source transfer packets are of varying lengths.

13. The data transfer system of claim 11, wherein the received select packets have associated channels that correspond with one or more of a predetermined set of channels.

14. The data transfer system of claim 11, further comprising:
a selection unit to:
   receive source packets via a source serial bus;
   select the select packets from the received source packets; and
   transfer the select packets to the aggregation unit.

15. The data transfer system of claim 14, wherein the selection unit is configured to select the select packets based on a header created for each of the source transfer packets.

16. A data transfer system comprising:
   an aggregation unit to receive select packets and aggregate the received select packets into source transfer packets, wherein each of the source transfer packets has an associated transmission cycle offset;
   a conversion unit to convert the source transfer packets to cells for transfer via a communication network;
   a reconfiguration unit to receive the cells and reconfigure the received cells into destination transfer packets corresponding to the source transfer packets; and
   a disaggregation unit to disaggregate the destination transfer packets into individual packets corresponding to the received select packets, and transmit the individual packets, wherein the individual packets are serially transmitted according to the associated transmission cycle offset.

17. The data transfer system of claim 16, wherein two or more of the source transfer packets are of varying lengths.

18. The data transfer system of claim 16, wherein the received select packets have associated channels that correspond with one or more of a predetermined set of channels.

19. The data transfer system of claim 16, further comprising:
a selection unit to:
   receive source packets via a source serial bus;
   select the select packets from the received source packets; and
   transfer the select packets to the aggregation unit.

20. The data transfer system of claim 19, wherein the selection unit is configured to select the select packets based on a header created for each of the source transfer packets.

21. A system comprising:
   means for selecting packets from among packets received during a transmission cycle of a first serial bus;
   means for aggregating the selected packets to form a first transfer packet;
   means for converting the first transfer packet into a cell for transmission via a communication network;
   means for configuring the cell into a second transfer packet, the second transfer packet corresponding to the first transfer packet;
   means for disaggregating the second transfer packet to form individual packets, the individual packets corresponding to the selected packets; and
   means for transmitting the individual packets to a second serial bus during a transmission cycle of the second serial bus based on the transmission cycle of the first serial bus and a transmission cycle offset.

* * * * *